US008843781B1

United States Patent
Chiang et al.

(12) United States Patent
(10) Patent No.: US 8,843,781 B1
(45) Date of Patent: Sep. 23, 2014

(54) MANAGING DRIVE ERROR INFORMATION IN DATA STORAGE SYSTEMS

(75) Inventors: Mei-Chun Chiang, Acton, MA (US); Lili Chen, Hopkinton, MA (US); Liu Zhiqi, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 499 days.

(21) Appl. No.: 13/173,741

(22) Filed: Jun. 30, 2011

(51) Int. Cl.
*G06F 11/00* (2006.01)

(52) U.S. Cl.
USPC .............. 714/6.11; 714/42; 714/6.1

(58) Field of Classification Search
CPC ........... G06F 11/0727; G06F 11/0766; G06F 11/0775; G06F 11/3476
See application file for complete search history.

(56) References Cited

U.S. PATENT DOCUMENTS

| | | | |
|---|---|---|---|
| 6,731,445 B1 * | 5/2004 | Houston | 360/55 |
| 7,346,804 B2 * | 3/2008 | Forrer et al. | 714/5.1 |
| 7,451,355 B1 * | 11/2008 | Coatney et al. | 714/42 |
| 7,660,978 B2 * | 2/2010 | Forrer et al. | 713/1 |
| 7,996,724 B1 * | 8/2011 | Coatney et al. | 714/42 |
| 8,055,954 B2 * | 11/2011 | Lenart et al. | 714/48 |
| 2002/0036850 A1 * | 3/2002 | Lenny et al. | 360/31 |
| 2009/0248753 A1 * | 10/2009 | Tsai et al. | 707/202 |

OTHER PUBLICATIONS

SMARTCTL, Control and Monitor Utility for SMART Disks, May 12, 2013.*
SANtools, SMARTMon User Manual, SANtools, Inc., 2005.*
Oracle Enterprise Manager, System Monitoring Plug-in Metric Reference Manual for Storage Management, 10gRelease 2 (10.2.0.4), Jun. 2008.*

* cited by examiner

*Primary Examiner* — Michael Maskulinski
(74) *Attorney, Agent, or Firm* — Krishnendu Gupta; Jason A. Reyes (57) ABSTRACT

A method and system is used in managing drive error information. An error is detected in connection with a drive. Error data associated with the drive error is collected in response to detecting the error. The error data is stored on the drive. The error data being sufficiently complete to allow a comprehensive evaluation of the error.

18 Claims, 4 Drawing Sheets

MANAGING DRIVE ERROR INFORMATION IN DATA STORAGE SYSTEMS

BACKGROUND

1. Technical Field

This application generally relates to managing drive error information in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives (also referred to as "disks" or "drives"), and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Disk drives are used as primary data storage devices in data storage systems and other modern computer systems and networks. While very reliable, today's disk drives occasionally fail. In addition to causing computer system downtime, such disk drive failures can result in the loss of some or all of the data stored in the disk drive. Accordingly, disk drives commonly perform Predictive Failure Analysis (PFA) using Self-Monitoring, Analysis and Reporting Technology (SMART), to predict disk drive failure caused by the gradual decay of electrical and/or mechanical components of the disk drive. The primary goal of PFA is to predict when disk drive failure is imminent to allow the data stored in the disk drive to be archived.

PFA is generally performed during the operation of the disk drive by monitoring key disk drive attributes that are indicative of the health of the disk drive. Additionally PFA can be implemented by performing periodic self-diagnostic tests on the disk drive. Present methods of performing PFA in disk drives will predict imminent disk drive failure based upon errors associated with a single attribute (e.g., read errors, seek errors, fly-height errors, etc.). In these methods, errors corresponding to the single attribute are monitored and compared to a threshold value. When the errors exceed the threshold, a warning of imminent disk drive failure is provided to the user.

SUMMARY OF THE INVENTION

A method and system is used in managing drive error information. An error is detected in connection with a drive. Error data associated with the drive error is collected in response to detecting the error. The error data is stored on the drive. The error data being sufficiently complete to allow a comprehensive evaluation of the error.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing drive error information in data storage systems. In at least one implementation, the technique may be used to help provide a system and method for recording comprehensive drive error information and replicating drive error sequences in order to reproduce drive-introduced system erroneous behaviors.

Conventionally, when a drive reports errors, its error information is saved into event logs and system traces for future analysis, and the space for each error entry in event logs is limited and only a fraction of available information can be saved. In addition, in such a conventional system, system traces can easily wrap around and often lose information only days old. Conventionally, without an efficient logging mechanism for drive error history, it is difficult for sustaining and field personnel to determine the proper actions to take on faulty drives.

By contrast, functionality (Disk Collect) in accordance with the technique described herein aims to provide persistent and comprehensive error loggings by preserving drive error information onto drive media, and providing a Microsoft Excel based database to analyze drive error history and trends.

System-level misbehaviors can result from drive errors or drive failures. In order to reproduce the original system level error behavior for software analysis, it is often required to mimic the exact drive error sequence. Conventionally, systems lack a reliable method of achieving this goal and therefore the reproduction effort is challenging. By contrast, Disk Collect lays a solid foundation of maintaining past drive errors and enables a replay utility to retrieve error information from drives and replicate an exact drive error sequence.

Conventional approaches of drive error logging include both event logs and system ktraces, with each event log entry limited to 0x80 bytes. Conventionally, lacking DIEH, RLS and other critical information in each error record restrains the ability to analyze the trend of drive failures. In addition in conventional systems, system ktraces space is limited, the ktrace buffer can wrap around in an average of 2 days, and without a comprehensive and sustainable logging mechanism for drive errors, it is excessively demanding to identify the fault drive or determine the proper actions for bad drives.

A conventional approach for reproducing system-level misbehaviors introduced by bad drives relies solely on getting the original bad drive and re-running the customer's I/O profiles.

However, conventionally, due to customer site regulations or company internal bad drive handling processes, it can be complicated to get bad drives back, and about 40% to 50% of bad drives do not exhibit the same error behaviors after being returned. Therefore, in conventional situations the effort of reproducing system misbehaviors with drive errors is not only time-consuming but also ineffective.

By contrast, Disk Collect offers significant advantages over conventional approaches:

a. Disk Collect saves drive error information onto drive media in the first 0x1000 blocks. Each block contains two error records. In total, it holds up to 0x2000 records of drive errors;

b. Each drive error is more than 200 bytes in size. Comprehensive information, including drive position, error command, drive death reason, drive check condition, port controller status, DIEH, and RLS are preserved along with each occurrence of drive errors;

c. Drive error information is persistent across array power cycles and drive removal/re-insertion.

d. Information on the drive can be retrieved and ported into an Excel-based database for additional analysis. The parsing tool is PC-based and thus independent of the storage system's operating system.

e. Error sequence can be replicated by retrieving drive errors from Disk Collect records and injecting them into the I/O path. It offers a reliable and scalable solution to reproduce system-level misbehaviors introduced by drive errors.

DIEH and related information are described in more detail in co-pending co-assigned U.S. patent application Ser. No. 12/977,962, filed 23 Dec. 2010, entitled ANALYZING DRIVE ERRORS IN DATA STORAGE SYSTEMS, which is hereby incorporated herein by reference in its entirety.

Figure 1:
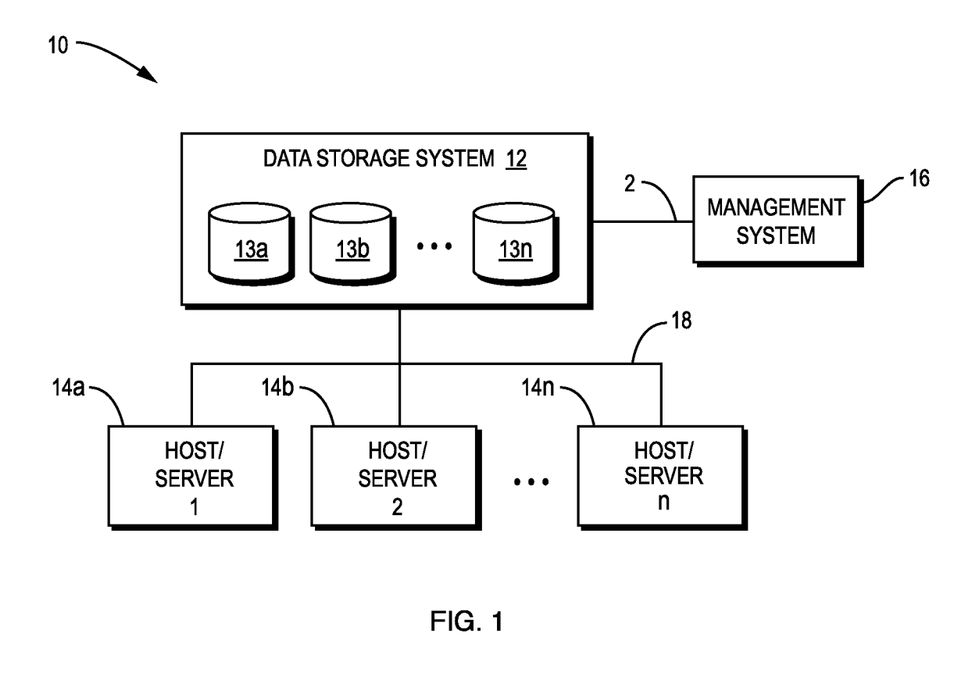
FIGS. 1-4 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of a variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as drives. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk drive devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
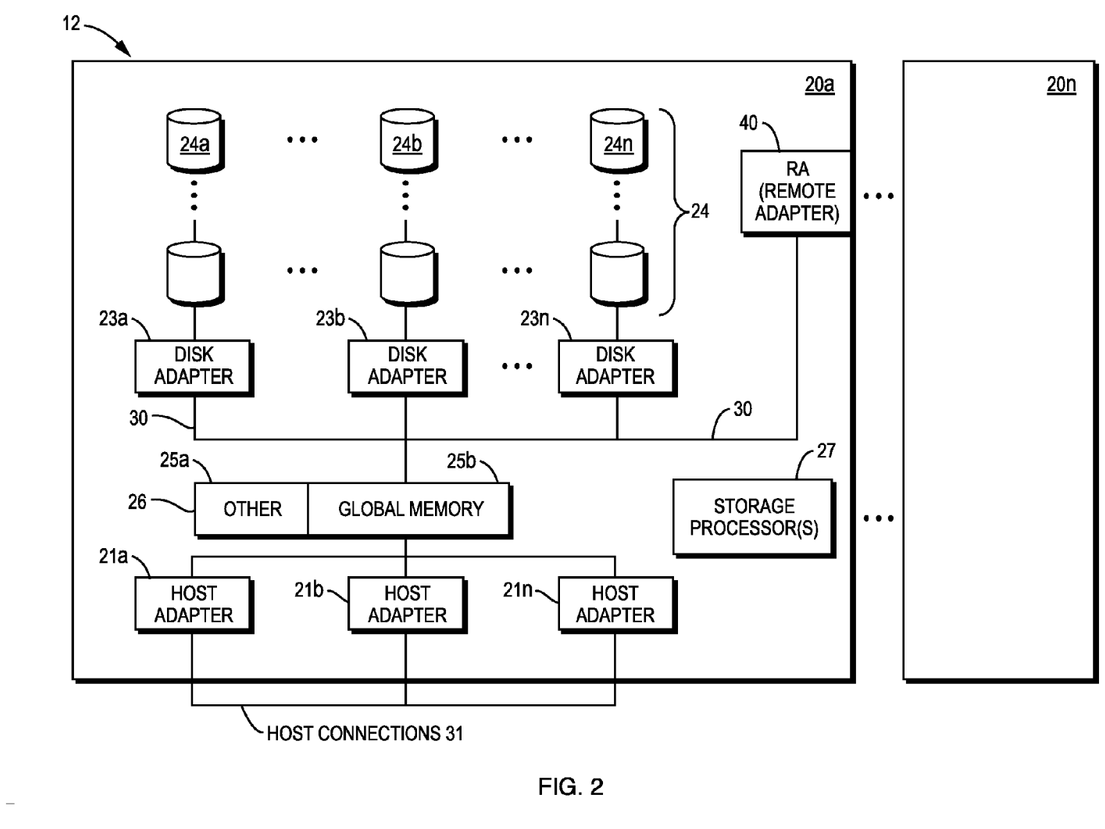

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk drive devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

I/O operations performed in a data storage system may include I/O operations of a first type which are received by the data storage system from an external client, such as a host. I/O operations performed by the data storage system may also include other I/O operations of a second type which are not initiated by the host or other external client. Rather, these other I/O operations may be initiated from within the data storage system, such as by a backend component of the data storage system. I/O operations of this second type may be referred to as background I/O operations which are not executed in a context of a host I/O, or more generally, in a context of an external client I/O operation. Background I/O operations may include I/O operations performed in connection with, for example, monitoring and maintaining the data storage system such as repairing a RAID drive (e.g., read and/or write operations in connection with correcting corrupted user data and/or RAID parity information), performing an I/O operation to check on the status and proper functioning of a physical drive, initializing a physical drive by writing out a particular initialization value or pattern to physical drive portions, and the like.

Figure 3:
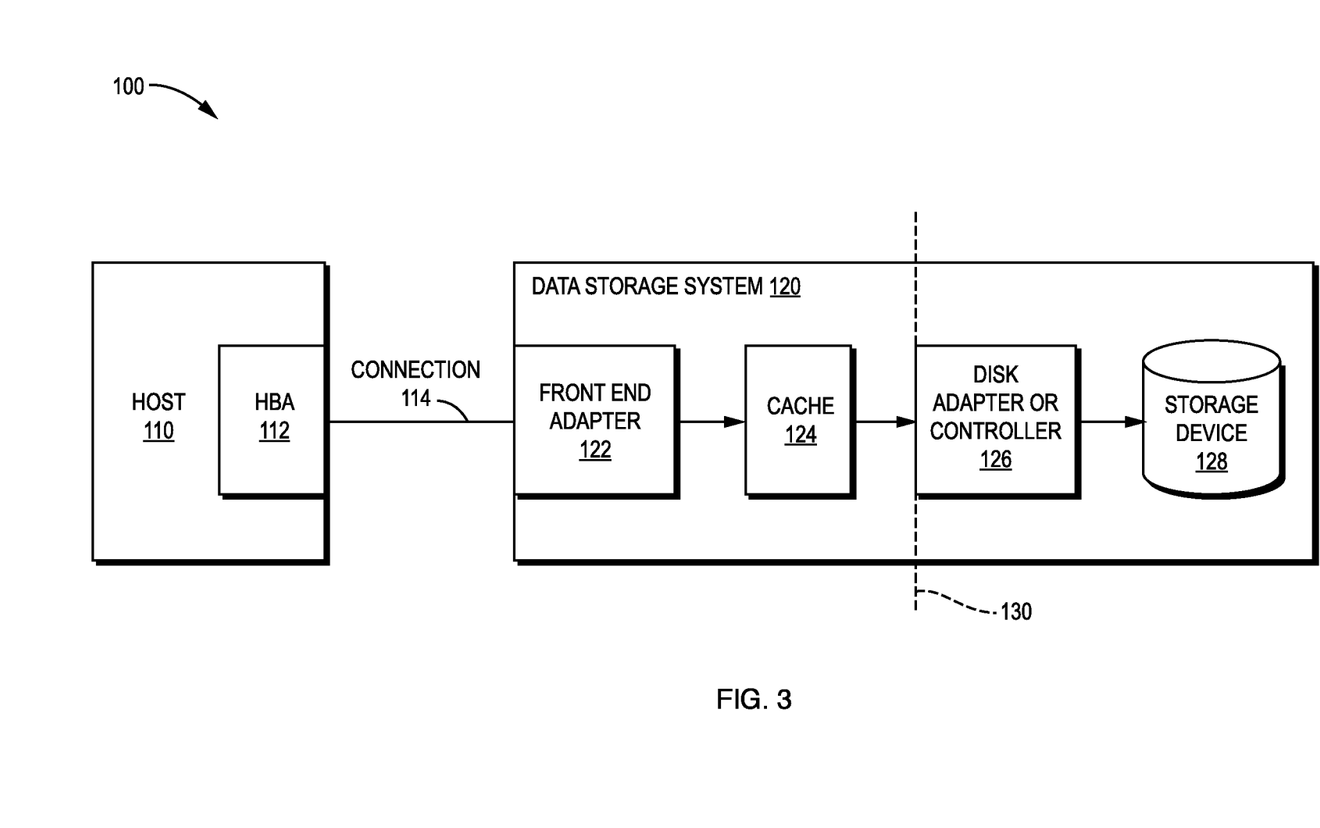

With reference to FIG. 3, shown is an example 100 illustrating components of a system that may be used in performing the different types of I/O operations in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the first type described above. The DA is an example of a backend data storage system component that may also initiate I/O operations. For example, the DA may initiate an I/O operation to periodically test or verify the health and status of the physical device 128. This latter I/O operation as initiated by the DA may be characterized as a background I/O operation described above which is not in the context of an I/O operation from the host or other client external to the data storage system. In such an embodiment, line 130 may represent an imaginary line within the system 120 partitioning the backend from the front end of the data storage system 120. In this embodiment, the background operations may be characterized as data storage system initiated operations and, more particularly, in some embodiments, such background operations may be initiated by a backend component such as a DA.

In a system such as a data storage system described above, there may be drive errors when performing the different types of I/O operations. Described in following paragraphs are processes that may be used in connection with managing drive error information in data storage systems.

Figure 4:
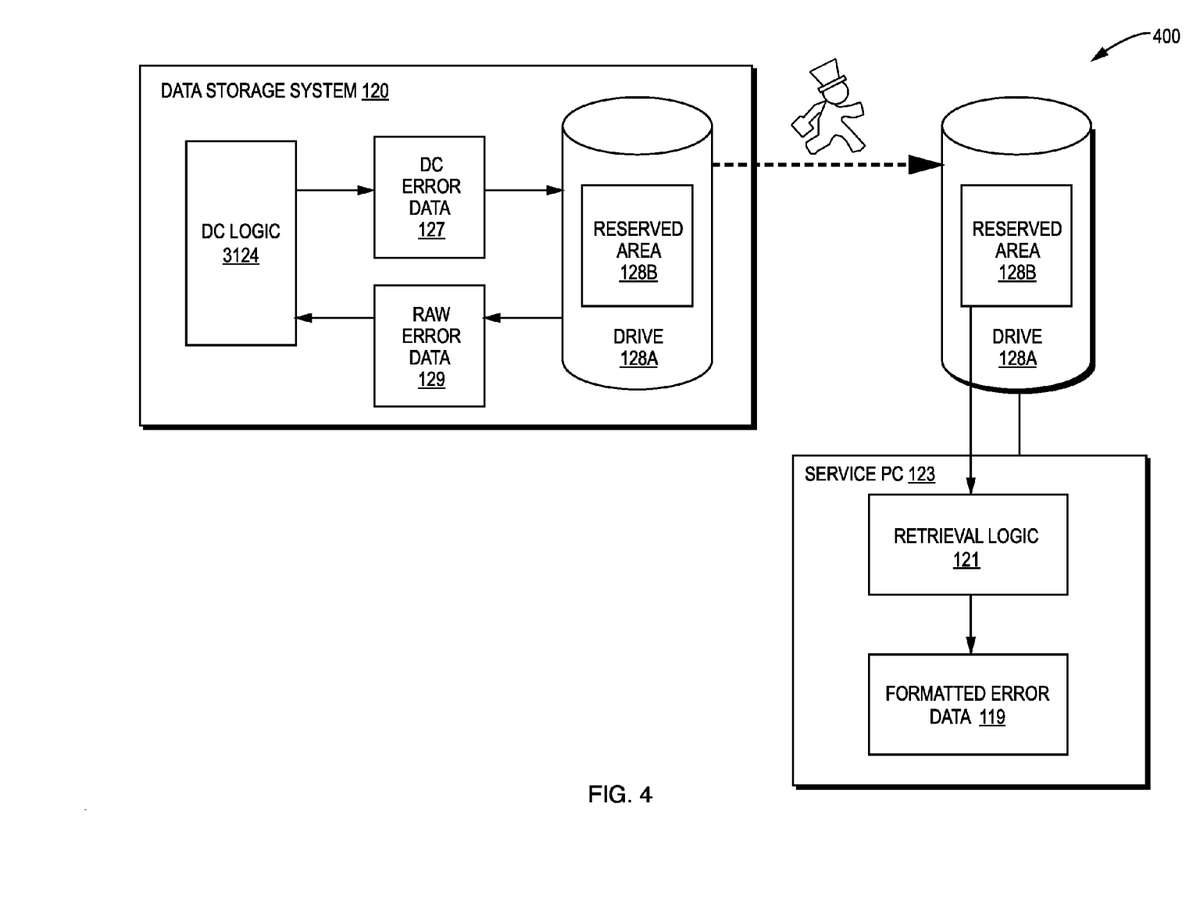

With reference to FIG. 4, shown is an example 400 illustrating components of a system that may be used in performing management of drive error information in an embodiment in accordance with techniques herein. In system 120, drive 128A emits raw error data 129 during normal data handling operations and/or on request. Data 129 may include information about SCSI errors and FIS errors and errors that happen during drive discovery, such as INQ and MODE_SENSE. In general, data 129 may include information about recoverable errors (most of the 01XX SCSI errors), media errors (e.g., errors that require a remap), hardware errors (errors indicating the drive hardware has a problem), link errors (errors indicating the link between the drive and its connection port is bad), and data errors (indicating data is corrupted and the drive is not even aware of the issue (which is caught by RAID only)).

Disk collect logic 3124, which may be or include software running in system 120, collects data 129 and derives disk collect error data 127 from data 129. Disk collect logic 3124 may include Disk Collect functionality described above.

Depending on the implementation, data 127 may include all or part of data 129 and may also include filtered, processed, and/or normalized error data based on data 129.

Logic 3124 stores data 127 in a reserved storage area 128B of drive 128A. In at least one implementation, the first 0x1000 blocks of drive 128A serve as area 128B.

Errors described in data 129 in at least one implementation may include most or all errors trackable by drive 128A including ATA errors, uncorrectable data errors (UNC), requested ID not found (IDNF) errors, servo errors, write fault errors, read errors and hardware and software resets.

Depending on the implementation, a retrieve SMART drive error log subcommand may be used to cause drive 128A to return an error logging sector data structure to logic 3124. For example, contained in the error logging sector data structure may be a drive error logging version number, an error log data structure pointer, a predetermined number of error log data structures, an ATA device error count and a data structure checksum.

The contents of area 128B may be retrieved as follows, e.g., by service personnel. Drive 128A is removed from system 120 and is connected to a service PC 123 having retrieval logic 121 which may be or include software running on PC 123. Logic 121 accesses drive 128A to retrieve all or a portion of the contents of area 128B, and derives formatted error data 119 from the retrieved contents. In at least one implementation, data 119 includes a spreadsheet file that formats the retrieved contents in a way that can be analyzed by tools that operate on spreadsheets.

In a particular example, with respect to service personnel, when drive 128A fails, drive 128A is returned to the vendor for diagnosis using an RMA procedure, and the vendor conducts failure/fault analysis on drive 128A having area 128B as described above. Upon receipt, the drive is mounted in a test bed which may include a disk slot with appropriate connections (SCSI, fibre channel, IDE, etc.) to PC 123. This PC can be a conventional file server having a processor, storage adapter, memory, and network adapter running a version of the storage operating system or a server operating system such as Microsoft Windows. The storage adapter is connected to the drive, whose area 128B is under analysis. The analysis procedure is controlled and reviewed via a user interface interconnected with the PC. Within the PC, logic 121 manages reading and interpretation of the contents of area 128B for the vendor. Note that in some implementations this logic 121 can be present in the user's storage operating system as well for reading area 128B and assisting the vendor with possible remote failure analysis of the drive. In other implementations, area 128B is purposely configured to be inaccessible to the user. It is expressly contemplated that failure analysis can include remote sensing of area 128B using network connections to communicate from PC 123 at the vendor's (or service provider's) site with the user's file server at the user's site and its connected failed drive. As such a test bed is deemed to include a connection between a diagnosing computer and the user's own storage system, typically via the network adapter.

A SCSI read command may be employed to address area 128B, and its contents are read into the vendor's file server for processing by logic 121. In at least one implementation, the contents are also stored in data 119 under an entry for that disk in the system 120. The entry for the drive may have been originally established when the drive was first sent to a customer. The drive's unique serial number or World Wide Name, can be used to index data 119. Depending on the situation, the contents of area 128B may then interpreted by automatic and human-based decision processes to determine whether the drive is reusable. The criteria for reusability are highly variable and may involve the accessing of any stored prior history of failures for the drive as well as the type of errors (e.g., hardware versus software). This history is established from prior readings of area 128B, if any.

In at least some implementations, data 127 is first buffered or accumulated in a memory area of system 120, which memory area is flushed to area 128B, e.g., periodically or when such memory area is full or when drive 128A is otherwise idle. Buffering data 127 in this way helps avoid excessive adverse performance effects of logic 3124 contending with other logic within system 120 for access to drive 128A.

In order to make an analysis of drive failure, a service person may manually parse through data 119 to decide which error events point to the root cause and which may only be side-effects, or may do so with the aid of tools that can process data 119 automatically. In at least some cases, the larger the size of area 128B, the more complete the error history that is available, and the more complete the error history in data 119, the more accurate the identification of the root cause.

For example, a drive failure related event ("event") may be identified for analysis. For example, a user or a computer program may select an event for root cause analysis from a set of events. Data from data 119 may be filtered to produce a filtered subset of event data. The filters may select events related to given characteristics or events occurring within a given time frame. Applying the filters to data 119 can be performed by a using module, instructions, and/or other using means to use the filter to select the subset of events.

This filtered subset of event data can be presented to the user. Presenting the relevant log messages is part of providing the subset of events to determine a cause of the selected event and can be performed by a providing module, instructions, and/or other providing means. Determining a cause of the selected event can be performed by root cause analysis software, which can be part of a determining module, instructions, or other determining means.

As referenced above, a conventional system has the following characteristics. The data in relation to a drive error is saved in a system ktrace and event log. The ktrace is in non-persistent memory and is therefore lost on reboot. Furthermore, the ktrace has limited storage space. It can usually store data for about 1 week. The event log is independent of the ktrace. The event log is in persistent memory and stores only 0x80 bytes which is also extremely limited storage space. In the conventional approach, it can be difficult to determine the proper actions to take in relation to a faulty drive, at least in part due to the lack of quality of the error data.

By contrast, the Disk Collect functionality that is used in addition to the ktrace and event log allows for a more complete analysis. The error data in the drive can be pulled from the drive and exported to Excel for review and analysis and used to replicate the drive error sequence which can be helpful in determining the corrective drive measures.

With Disk Collect, a command can also be used to retrieve error data, which is in binary, so the command gets the file and exports to Excel. In at least one implementation, the error data is saved in the beginning of each drive, and the drive is configured so that no other data is written there.

In at least one implementation, the software for the collection and storage of data is implemented as part of a physical drive object which is a software component inside the physical package.

Depending on the implementation, Disc Collect can produce and store statistics based on collected error data, and be applied to regular magnetic spinning drives and solid state drives.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing drive error information, the method comprising:
   detecting an error in connection with a drive;
   collecting error data associated with the drive error;
   storing the error data on the drive, wherein the error data is sufficiently complete to allow a comprehensive evaluation of the error; and
   allowing error data to be stored in a event log and a system ktrace.

2. The method as claimed in claim 1, further comprising:
   drawing the error data from the drive for allowing comprehensive evaluation of the error.

3. The method as claimed in claim 1, further comprising:
   providing a graphical user interface for enabling analysis of the error data by graphically displaying the error data stored on the drive.

4. The method as claimed in claim 3, wherein the graphical user interface comprises a spreadsheet for graphically displaying the error data stored on the drive.

5. The method as claimed in claim 1, further comprising:
   based on the stored error data on the drive, replicating the drive error sequence such that the original error behavior can be reproduced.

6. The method as claimed in claim 1, wherein the error data associated with the drive error and stored on the drive comprises information selected from the group consisting of:
   drive position,
   error command,
   drive death reason,
   drive check condition, and
   port controller status.

7. The method as claimed in claim 1, wherein storing the error data on the drive in the first 0x1000 blocks, wherein each block comprises two error records.

8. The method as claimed in claim 1, further comprising:
   based on the stored error data, allowing filtering of the error data for producing a filtered subset of the error data.

9. The method as claimed in claim 1, wherein the method is configured for use in managing drive error information in connection with magnetic spinning drives and solid state drives.

10. A system for use in managing drive error information, the system comprising:
    one or more processors; and a non-transitory computer-readable medium storing instructions for execution by the one or more processors, the instructions comprising instructions to:
  detect an error in connection with a drive;
  collect error data associated with the drive error;
  store the error data on the drive, wherein the error data is sufficiently complete to allow a comprehensive evaluation of the error; and
  allow error data to be stored in a event log and a system ktrace.

11. The system as claimed in claim 10, wherein the instructions further comprise instructions to:
  draw the error data from the drive for allowing comprehensive evaluation of the error.

12. The system as claimed in claim 10, wherein the instructions further comprise instructions to:
  provide a graphical user interface for enabling analysis of the error data by graphically displaying the error data stored on the drive.

13. The system as claimed in claim 12, wherein the graphical user interface comprises a spreadsheet for graphically displaying the error data stored on the drive.

14. The system as claimed in claim 10, wherein the instructions further comprise instructions to:
  replicate the drive error sequence such that the original error behavior can be reproduced based on the stored error data on the drive.

15. The system as claimed in claim 10, wherein the error data associated with the drive error and stored on the drive comprises information selected from the group consisting of:
  drive position,
  error command,
  drive death reason,
  drive check condition, and
  port controller status.

16. The system as claimed in claim 10, wherein storing the error data on the drive in the first 0x1000 blocks, wherein each block comprises two error records.

17. The system as claimed in claim 10, wherein the instructions further comprise instructions to:
  allow filtering of the error data for producing a filtered subset of the error data based on the stored error data.

18. The system as claimed in claim 10, wherein the system is configured for use in managing drive error information in connection with magnetic spinning drives and solid state drives.

* * * * *